(12) United States Patent
Yang et al.

(10) Patent No.: US 11,092,783 B2
(45) Date of Patent: Aug. 17, 2021

(54) OPTICAL IMAGING SYSTEM

(71) Applicant: Zhejiang Sunny Optical Co., Ltd, Ningbo (CN)

(72) Inventors: Jian Yang, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 494 days.

(21) Appl. No.: 16/073,627

(22) PCT Filed: Nov. 20, 2017

(86) PCT No.: PCT/CN2017/111842
§ 371 (c)(1),
(2) Date: Jul. 27, 2018

(87) PCT Pub. No.: WO2018/218889
PCT Pub. Date: Dec. 6, 2018

(65) Prior Publication Data
US 2021/0048625 A1 Feb. 18, 2021

(30) Foreign Application Priority Data

Jun. 2, 2017 (CN) .......................... 201710408244.7
Jun. 2, 2017 (CN) .......................... 201720633530.9

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2017/0248772 A1* 8/2017 Tang .................. G02B 9/64

FOREIGN PATENT DOCUMENTS

| CN | 105974561 A | 9/2016 |
|----|-------------|--------|
| CN | 106291882 A | 1/2017 |
| CN | 106990510 A | 7/2017 |

* cited by examiner

*Primary Examiner* — Darryl J Collins
*Assistant Examiner* — Matthew Y Lee
(74) *Attorney, Agent, or Firm* — Hauptman Ham, LLP

(57) ABSTRACT

The present disclosure discloses an optical imaging system, which includes, sequentially along an optical axis from an object side to an image side, a first lens to a seventh lens. The first lens has a negative refractive power, and a concave image-side surface; the fourth lens has a positive refractive power; the fifth lens has a positive or negative refractive power, and a concave image-side surface; the seventh lens has a positive or negative refractive power, an aspheric image-side surface and at least one inflection point; the second lens, each of the third lens and the sixth lens has a positive or negative refractive power. An effective radius DT11 of the object-side surface of the first lens and half of a diagonal length ImgH of an effective pixel area of an electronic photosensitive element of the optical imaging system satisfy: 0.5<DT11/ImgH<1.

21 Claims, 10 Drawing Sheets

OPTICAL IMAGING SYSTEM

RELATED APPLICATIONS

The present application is a National Phase of International Application Number PCT/CN2017/111842, filed Nov. 20, 2017, and claims the priority of China Application No. 201710408244.7, filed Jun. 2, 2017; and China Application No. 201720633530.9, filed Jun. 2, 2017.

TECHNICAL FIELD

The present disclosure relates to an optical imaging system, and more specifically, to a wide-angle camera lens assembly including seven lenses.

BACKGROUND

As the science and technology develop, wide-angle lens assemblies can be applied on more occasions, and due to their unique performance compared to the ordinary lens assemblies, the wide-angle lens assemblies are increasingly liked by various manufacturers and customers. The short focal length and the large depth of field of the wide-angle lens assembly can ensure that the scenery in front of and behind the subject being photographed can be clearly reproduced on the picture, which is very conducive to photographing. The wide-angle lens assembly also features a large field-of-view angle. Under the same condition, it can acquire more information, which is a very important application feature in the fields of the security lens assembly, the vehicle-mounted lens assembly, and so on.

At present, a typical wide-angle lens assembly mainly adopts an all-glass structure, having a long total length and an ordinary image quality. Due to the continuing development of portable electronic products, the increasingly large number of 360-degree panorama view applications currently on the market in particular, higher requirements on performances of the camera lens assembly such as miniaturization, lightweight, ultra-wide-angle and image quality are brought forward. In order to meet the requirements on miniaturization and lightweight, it is necessary to further shorten the overall length of the lens assembly and at the same time incorporate plastic lenses, to shorten the overall length of the system and enlarge the field-of-view angle. In general, the use of aspheric surfaces may not only significantly improve the image quality, reduce the aberration, but also reduce the number of lenses and reduce the volume. The material of the aspheric lens may be glass or plastic cement. The glass aspheric lens is further divided into two types made by two methods: grinding processing and die-cast forming. The use of the aspheric surfaces is a significant help to the performance improvement of the ultra-wide-angle lens assembly.

The present invention aims to provide a miniaturized, high image quality, seven-lens wide-angle lens assembly using aspheric surfaces.

SUMMARY

The technical solution provided by the present disclosure at least partially solves the technical problem described above.

According to one aspect, the present disclosure provides an optical imaging system. The optical imaging system includes sequentially, along an optical axis from an object side to an image side, a first lens, a second lens, a third lens, a fourth lens, a fifth lens, a sixth lens and a seventh lens. The first lens has a negative refractive power, and an image-side surface of the first lens is a concave surface. The fourth lens has a positive refractive power. The fifth lens has a positive refractive power or a negative refractive power, and an image-side surface of the fifth lens is a concave surface. The seventh lens has a positive refractive power or a negative refractive power, and an image-side surface of the seventh lens is an aspheric surface and has at least one inflection point. The second lens, the third lens and the sixth lens each has a positive refractive power or a negative refractive power. An effective radius DT11 of the object-side surface of the first lens and half of a diagonal length ImgH of an effective pixel area of an electronic photosensitive element of the optical imaging system may satisfy: $0.5<DT11/ImgH<1$, for example, $0.71 \leq DT11/ImgH \leq 0.87$.

According to another aspect, the present disclosure also provides an optical imaging system. The optical imaging system includes sequentially, along an optical axis from an object side to an image side, a first lens, a second lens, a third lens, a fourth lens, a fifth lens, a sixth lens and a seventh lens. The first lens has a negative refractive power, and an image-side surface of the first lens is a concave surface. The fourth lens has a positive refractive power. The fifth lens has a positive refractive power or a negative refractive power, and an image-side surface of the fifth lens is a concave surface. The seventh lens has a positive refractive power or a negative refractive power, and an image-side surface of the seventh lens is an aspheric surface and has at least one inflection point. The second lens, the third lens and the sixth lens each has a positive refractive power or a negative refractive power. A spacing distance T12 between the first lens and the second lens on the optical axis and a spacing distance T67 between the sixth lens and the seventh lens on the optical axis may satisfy: $0.9<T12/T67<2.7$, for example, $0.94 \leq T12/T67 \leq 2.64$.

In an implementation, an effective focal length f1 of the first lens and an effective focal length f4 of the fourth lens may satisfy: $-1.7<f1/f4<-1.1$, for example, $-1.52 \leq f1/f4 \leq -1.44$.

In an implementation, a center thickness CT3 of the third lens on the optical axis, a center thickness CT6 of the sixth lens on the optical axis, and a distance TTL from the object-side surface of the first lens to an image plane of the optical imaging system on the optical axis may satisfy: $(CT3+CT6)/TTL<0.15$, for example, $(CT3+CT6)/TTL \leq 0.13$.

In an implementation, the distance TTL from the object-side surface of the first lens to the image plane of the optical imaging system on the optical axis and an aperture value Fno of the optical imaging system may satisfy: $TTL/Fno<2.2$ (mm), for example, $TTL/Fno \leq 2.1$.

In an implementation, the half of the diagonal length ImgH of the effective pixel area of the electronic photosensitive element of the optical imaging system and a total effective focal length f of an optical imaging lens assembly of the optical imaging system may satisfy: $ImgH/f>1$, for example, $ImgH/f \geq 1.21$.

In an implementation, a center thickness CT2 of the second lens on the optical axis and the center thickness CT3 of the third lens on the optical axis may satisfy: $0.9<CT2/CT3<2.5$, for example, $0.93 \leq CT2/CT3 \leq 2.42$.

In an implementation, a sum of center thicknesses $\Sigma CT$ of the first lens to the seventh lens on the optical axis and the distance TTL from the object-side surface of the first lens to the image plane of the optical imaging system on the optical axis may satisfy: $\Sigma CT/TTL<0.6$, for example, $\Sigma CT/TTL \leq 0.5$.

In an implementation, a radius of curvature R7 of an object-side surface of the fourth lens and a radius of curvature R8 of an image-side surface of the fourth lens may satisfy: $-1.6 < R7/R8 < -0.5$, for example, $-1.57 \leq R7/R8 \leq -0.61$.

In an implementation, the effective radius DT11 of the object-side surface of the first lens and an effective radius DT72 of the image-side surface of the seventh lens may satisfy: $0.7 < DT11/DT72 < 1.3$, for example, $0.87 \leq DT11/DT72 \leq 1.16$.

The optical imaging system with the above configuration may further have at least one of the beneficial effects of miniaturization, ultra-wide-angle, high image quality, high definition, low sensitivity, and balanced aberration and the like.

BRIEF DESCRIPTION OF THE DRAWINGS

The above and other advantages of implementations of the present disclosure will become apparent from the following detailed description with reference to the accompanying drawings, which are intended to illustrate the exemplary implementations of the present disclosure rather than limiting them. In the accompanying drawings.

DETAILED DESCRIPTION

Figure 1:
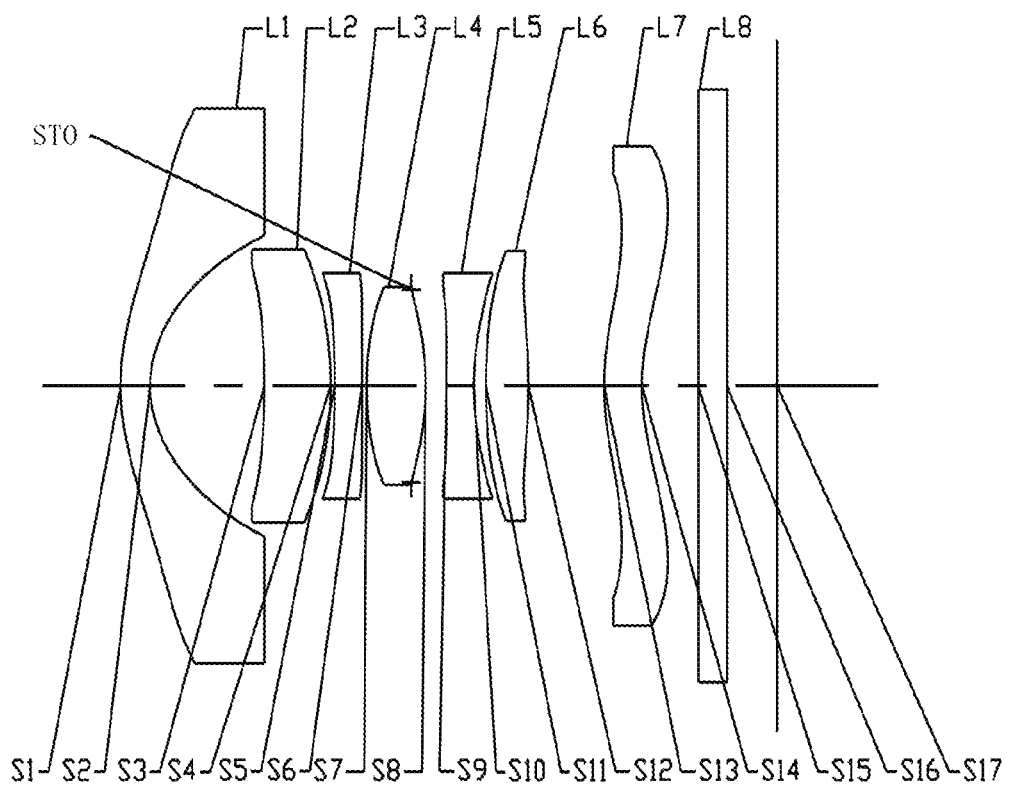
FIG. 1 is a schematic structural diagram illustrating an optical imaging system according to Embodiment 1 of the present disclosure.

To better understand the present disclosure, various aspects of the present disclosure will be described in more detail with reference to the accompanying drawings. It should be understood that the detailed description is merely illustrative of the exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions of the first, the second, etc. are used only to distinguish one feature from another, without indicating any limitation to the feature. Thus, the first lens discussed below may also be referred to as the second lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

As used herein, the terms "substantially," "about" and similar terms are used to indicate an approximation rather than a degree, and are intended to be illustrative of the inherent deviations of measured or calculated values as recognized by those of ordinary skill in the art.

Unless otherwise defined, all terms (including technical and scientific terms) used herein have the same meaning as commonly understood by those of ordinary skill in the art to which the present disclosure directs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object and the seventh lens is the lens closest to the photosensitive element. In this text, the surface closest to the object in each lens is referred to as the object-side surface, and the surface closest to the image plane in each lens is referred to as the image-side surface.

It should be noted that the embodiments in the present disclosure and the features in the embodiments may be combined with each other on a non-conflict basis. The present disclosure will be described below in detail with reference to the accompanying drawings and in combination with the embodiments.

The present disclosure is further described below with reference to the specific embodiments.

The optical imaging system according to exemplary implementations of the present disclosure has, for example, seven lenses, i.e., a first lens, a second lens, a third lens, a fourth lens, a fifth lens, a sixth lens and a seventh lens. The seven lenses are arranged in sequence from an object side to an image side along an optical axis.

In an exemplary implementation, the first lens may have a negative refractive power, and an image-side surface of the first lens is a concave surface. The fourth lens may have a positive refractive power. The fifth lens may have a positive refractive power or a negative refractive power, and an image-side surface of the fifth lens is a concave surface. The seventh lens may have a positive refractive power or a negative refractive power, and an image-side surface of the seventh lens is an aspheric surface and has at least one inflection point. Alternatively, the second lens, the third lens and the sixth lens each may have a positive refractive power or a negative refractive power. By properly controlling the positive and negative distribution of the refractive power of each lens in the system, low-order aberrations of the system may be effectively balanced and controlled, enabling the system to obtain a better image quality.

In an exemplary implementation, an effective radius DT11 of the object-side surface of the first lens and half of a diagonal length ImgH of an effective pixel area of an electronic photosensitive element of the optical imaging system may satisfy: $0.5<DT11/ImgH<1$, and more specifically, may further satisfy: $0.71 \leq DT11/ImgH \leq 0.87$. Under the premise that the image plane of the system satisfies the specifications, by properly selecting the effective radius of the object-side surface of the first lens, the incident angle of light can be reasonably reduced, thereby reducing the system sensitivity and ensuring the stability of the assembling.

In an exemplary implementation, an effective focal length f1 of the first lens and an effective focal length f4 of the fourth lens may satisfy: $-1.7<f1/f4<-1.1$, and more specifically, may further satisfy: $-1.52 \leq f1/f4 \leq -1.44$. Such a configuration helps to ensure the miniaturization of the system, at the same time may improve the field-of-view angle and realize the ultra-wide-angle characteristic, and effectively correct various types of aberrations, improve the image quality and the sharpness while reducing the sensitivity.

In an exemplary implementation, a spacing distance T12 between the first lens and the second lens on the optical axis and a spacing distance T67 between the sixth lens and the seventh lens on the optical axis may satisfy: $0.9<T12/T67<2.7$, and more specifically, may further satisfy: $0.94 \leq T12/T67 \leq 2.64$. By properly configuring T12 and T67, under the premise of ensuring the image quality, an average distribution of the center thicknesses of the lenses is conducive to the production and assembling of the lens assembly of the system.

In an exemplary implementation, a center thickness CT3 of the third lens on the optical axis, a center thickness CT6 of the sixth lens on the optical axis, and a distance TTL from the object-side surface of the first lens to the image plane of the optical imaging system on the optical axis may satisfy: $(CT3+CT6)/TTL<0.15$, and more specifically, may further satisfy: $(CT3+CT6)/TTL \leq 0.13$. By properly selecting the ratio of the total lengths of the third lens and the sixth lens to the optical system, the field curvature of the optical system can be effectively adjusted, the performance of the system can be ensured, and the yield in the actual production of the lens assembly can be improved.

In an exemplary implementation, the distance TTL from the object-side surface of the first lens to the image plane of the optical imaging system on the optical axis and an aperture value Fno of the optical imaging system may satisfy: $TTL/Fno<2.2$ (mm), and more specifically, may further satisfy: $TTL/Fno \leq 2.1$. By properly selecting the range of TTL and Fno, it is possible to reduce the influence of the off-axis aberration on the system and improve the image quality by reducing the amount of light admitted, under the premise that the miniaturization of the lens assembly is satisfied.

In an exemplary implementation, the half of the diagonal length ImgH of the effective pixel area of the electronic photosensitive element of the optical imaging system and a total effective focal length f of an optical imaging lens assembly of the optical imaging system may satisfy: $ImgH/f>1$, and more specifically, may further satisfy: $ImgH/f \geq 1.21$. By properly selecting the ratio of ImgH and f, the field-of-view angle of the lens assembly of the system can be improved, ensuring the large field-of-view characteristic of the lens assembly of the system.

In an exemplary implementation, a center thickness CT2 of the second lens on the optical axis and the center thickness CT3 of the third lens on the optical axis may satisfy: $0.9<CT2/CT3<2.5$, and more specifically, may further satisfy: $0.93 \leq CT2/CT3 \leq 2.42$. By properly configuring the thickness of the second lens and the thickness of the third lens, the chromatic aberration of the system can be effectively reduced, and the size of the lens assembly can be guaranteed to be reasonable, ensuring the stability in the production process of the lens assembly.

In an exemplary implementation, a sum of center thicknesses $\Sigma CT$ of the first lens to the seventh lens on the optical axis and the distance TTL from the object-side surface of the first lens to the image plane of the optical imaging system on the optical axis may satisfy: $\Sigma CT/TTL<0.6$, and more specifically, may further satisfy: $\Sigma CT/TTL \leq 0.5$. By properly selecting $\Sigma CT$ and TTL, it is possible to minimize the total length of the lens assembly of the system, i.e., $\Sigma CT$, and ensure the miniaturization of the lens assembly of the system, while TTL is guaranteed to meet the specifications.

In an exemplary implementation, a radius of curvature R7 of an object-side surface of the fourth lens and a radius of curvature R8 of an image-side surface of the fourth lens may satisfy: $-1.6<R7/R8<-0.5$, and more specifically, may further satisfy: $-1.57 \leq R7/R8 \leq -0.61$. By properly selecting the radius of curvature of the fourth lens, the spherical aberration of the system can be effectively reduced, improving the image quality of the system.

In an exemplary implementation, the effective radius DT11 of the object-side surface of the first lens and an effective radius DT72 of the image-side surface of the seventh lens may satisfy: 0.7<DT11/DT72<1.3, and more specifically, may further satisfy: 0.87≤DT11/DT72≤1.16. By properly selecting DT11 and DT72, the off-axis aberration of the system can be effectively corrected, and the ultra-wide-angle characteristic can be achieved, whiling satisfying the assembling conditions.

In the exemplary implementations, the optical imaging system may also provide an aperture STO to limit light beams, adjust the amount of light admitted and improve the image quality. The optical imaging system according to the above implementations of the present disclosure may use multiple lenses, for example, seven lenses as described in the preceding text. By properly allocating the refractive power, surface type of each lens, the center thickness of each lens and the axial spacing distance between the lenses, etc., it is possible to effectively enlarge the aperture of the optical imaging system, reduce the system sensitivity, ensure the miniaturization of the lens assembly and improve the image quality, thus making the optical imaging system more conducive to the production and processing and may be applicable to portable electronic products. In the implementations of the present disclosure, at least one of the mirror surfaces of the each lens is an aspheric mirror surface. The feature of the aspheric lens is: from the center of the lens to the periphery, the curvature is continuously changing. Unlike the spherical lens with a constant curvature from the center of the lens to the periphery, the aspheric lens has a better radius-of-curvature feature, having advantages of improving a distortion aberration and improving an astigmatic aberration, capable of making the field of view larger and more realistic. Using the aspheric lens, an aberration occurred at the time of imaging can be eliminated as far as possible, thereby improving the image quality. In addition, the use of the aspheric lens may also effectively reduce the number of lenses in the optical system.

However, it should be understood by those skilled in the art that the various results and advantages described in the present specification may be obtained by changing the number of the lenses constituting the lens assembly without departing from the technical solution claimed by the present disclosure. For example, although seven lenses are described as an example in the implementations, the optical imaging system is not limited to including seven lenses. If desired, the optical imaging system may also include other numbers of lenses.

Specific embodiments of the optical imaging system that may be applied to the above implementations are further described below with reference to the accompanying drawings.

Embodiment 1

The optical imaging system according to Embodiment 1 of the present disclosure is described below with reference to FIG. 1 to FIG. 2D.

FIG. 1 illustrates a schematic structural diagram of an optical imaging system according to Embodiment 1 of the present disclosure. As shown in FIG. 1, the optical imaging system along an optical axis from an object side to an image side includes seven lenses L1-L7 arranged in sequence. The first lens L1 has an object-side surface S1 and an image-side surface S2; the second lens L2 has an object-side surface S3 and an image-side surface S4; the third lens L3 has an object-side surface S5 and an image-side surface S6; the fourth lens L4 has an object-side surface S7 and an image-side surface S8; the fifth lens L5 has an object-side surface S9 and an image-side surface S10; the sixth lens L6 has an object-side surface S11 and an image-side surface S12; and the seventh lens L7 has an object-side surface S13 and an image-side surface S14.

In the present embodiment, the first lens may have a negative refractive power, and an image-side surface of the first lens is a concave surface. The fourth lens may have a positive refractive power. The fifth lens may have a positive refractive power or a negative refractive power, and an image-side surface of the fifth lens is a concave surface. The seventh lens may have a positive refractive power or a negative refractive power, and an image-side surface of the seventh lens is an aspheric surface and has at least one inflection point. Alternatively, the second lens, the third lens and the sixth lens each may have a positive refractive power or a negative refractive power. In the optical imaging system of the present embodiment, an aperture STO is also included for limiting the light beams. The optical imaging system according to Embodiment 1 may include an optical filter L8 having an object-side surface S15 and an image-side surface S16, and the optical filter L8 may be used for correcting color deviations. Light from an object passes through the surfaces S1 to S16 sequentially and is finally imaged on an image plane S17.

Table 1 shows the surface type, the radius of curvature, the thickness, the material and the conic coefficient of each lens of the optical imaging system in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.0749 | 0.2158 | 1.55 | 56.1 | −2.7708 |
| S2 | aspheric | 0.5124 | 0.8349 | | | −0.8275 |
| S3 | aspheric | −3.5624 | 0.4841 | 1.67 | 20.3 | 0.0000 |
| S4 | aspheric | −1.8693 | 0.0300 | | | −10.0000 |
| S5 | aspheric | −6.4230 | 0.2000 | 1.67 | 20.3 | −10.0000 |
| S6 | aspheric | −25.3405 | 0.0348 | | | 0.0000 |
| S7 | aspheric | 1.6865 | 0.4296 | 1.55 | 56.1 | −0.0945 |
| S8 | aspheric | −1.3409 | −0.1049 | | | −5.7911 |
| STO | spherical | infinite | 0.2571 | | | |
| S9 | aspheric | 10.1357 | 0.2000 | 1.67 | 20.3 | −10.0000 |
| S10 | aspheric | 1.1466 | 0.0899 | | | −9.3960 |
| S11 | aspheric | 2.8565 | 0.3101 | 1.55 | 56.1 | −1.8616 |
| S12 | aspheric | −2.8266 | 0.5526 | | | −9.1319 |
| S13 | aspheric | 1.1695 | 0.2777 | 1.55 | 56.1 | −3.8713 |

TABLE 1-continued

| surface number | surface type | radius of curvature | thickness | material refractive index | abbe number | conic coefficient |
|---|---|---|---|---|---|---|
| S14 | aspheric | 1.0131 | 0.4117 | | | −3.4039 |
| S15 | spherical | infinite | 0.2100 | 1.52 | 64.2 | |
| S16 | spherical | infinite | 0.3666 | | | |
| S17 | spherical | infinite | | | | |

As may be obtained from Table 1, the center thickness CT2 of the second lens L2 on the optical axis and the center thickness CT3 of the third lens L3 on the optical axis satisfy: CT2/CT3=2.42; the spacing distance T12 of the first lens L1 and the second lens L2 on the optical axis and the spacing distance T67 of the sixth lens L6 and the seventh lens L7 on the optical axis satisfy: T12/T67=1.51; and the radius of curvature R7 of the object-side surface S7 of the fourth lens L4 and the radius of curvature R8 of the image-side surface S8 of the fourth lens L4 satisfy: R7/R8=−1.26.

In this embodiment, seven lenses are used as an example. By properly allocating the focal lengths and the surface types of the lenses, the aperture of the lens assembly is effectively enlarged, the total length of the lens assembly is shortened, and the large aperture and the miniaturization of the lens assembly is ensured. At the same time, various types of aberrations are corrected, and the resolution and the image quality of the lens assembly are improved. The surface type x of each aspheric surface is defined by the following formula:

$$x = \frac{ch^2}{1+\sqrt{1-(k+1)c^2h^2}} + \sum A_i h^i \quad (1)$$

Here, x is the distance sagittal height from the apex of the aspheric surface when the aspheric surface is at a height of h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the higher-order coefficients $A_4$, $A_6$, $A_8$, $A_{10}$ and $A_{12}$ applicable to each mirror surface S1-S14 in Embodiment 1.

Table 3 below shows the effective focal lengths f1 to f7 of the lenses, the effective focal length f of the imaging lens assembly of the optical imaging system, the distance TTL from the object side surface S1 of the first lens L1 to the image plane S17 of the optical imaging system on the optical axis, the half of the diagonal length ImgH of the effective pixel area of the electronic photosensitive element of the optical imaging system and the aperture value Fno of the optical imaging system in Embodiment 1.

TABLE 3

| | |
|---|---|
| f (mm) | 1.43 |
| f1 (mm) | −2.08 |
| f2 (mm) | 5.30 |
| f3 (mm) | −12.97 |
| f4 (mm) | 1.44 |
| f5 (mm) | −1.96 |
| f6 (mm) | 2.65 |
| f7 (mm) | −37.18 |
| TTL (mm) | 4.80 |
| ImgH (mm) | 1.80 |
| Fno | 2.29 |

According to Table 3, the effective focal length f1 of the first lens L1 and the effective focal length f4 of the fourth lens L4 satisfy: f1/f4=−1.44; the distance TTL from the object-side surface S1 of the first lens L1 to the image plane S17 of the optical imaging system on the optical axis and the aperture value Fno of the optical imaging system satisfy: TTL/Fno=2.1 (mm); and the half of the diagonal length ImgH of the effective pixel area of the electronic photosensitive element of the optical imaging system and the effective focal length f of the optical imaging lens assembly of the optical imaging system satisfy: ImgH/f=1.26.

In this embodiment, the sum of center thicknesses ΣCT of the first lens L1 to the seventh lens L7 on the optical axis and the distance TTL from the object-side surface S1 of the first lens L1 to the image plane S17 of the optical imaging system

TABLE 2

| surface number | A4 | A6 | A8 | A10 | A12 |
|---|---|---|---|---|---|
| S1 | −9.6388E−02 | 2.7647E−02 | 0.0000E+00 | 0.0000E+00 | 0.0000E+00 |
| S2 | −1.2504E−01 | 2.2780E−01 | 0.0000E+00 | 0.0000E+00 | 0.0000E+00 |
| S3 | −4.9214E−02 | −2.4138E−01 | 8.2005E−02 | 1.7018E−01 | 0.0000E+00 |
| S4 | −3.7817E−01 | 5.2581E−01 | −6.4127E−01 | 4.8083E−01 | 0.0000E+00 |
| S5 | −4.7982E−01 | 1.1694E+00 | −2.7158E+00 | 1.3790E+00 | 0.0000E+00 |
| S6 | 1.2319E−01 | 9.8085E−03 | −2.0124E+00 | 2.1905E+00 | 0.0000E+00 |
| S7 | 5.1450E−01 | −9.4407E−01 | 8.3033E−01 | 0.0000E+00 | 0.0000E+00 |
| S8 | −2.3039E−01 | 4.3067E−01 | −2.1810E−01 | 0.0000E+00 | 0.0000E+00 |
| S9 | −6.0479E−01 | 1.2000E+00 | −2.4522E+00 | 2.3430E+00 | 0.0000E+00 |
| S10 | 3.9004E−02 | 1.4386E−01 | −3.4025E−01 | 8.1873E−01 | 0.0000E+00 |
| S11 | 1.9786E−02 | 8.0143E−01 | −2.1674E+00 | 2.8406E+00 | −1.5778E+00 |
| S12 | −8.5896E−04 | 6.4411E−01 | −2.4592E−01 | −3.1166E−01 | 0.0000E+00 |
| S13 | −3.0011E−01 | 1.6941E−01 | −6.1868E−02 | 6.3830E−03 | 0.0000E+00 |
| S14 | −2.4703E−01 | 1.3387E−01 | −5.4132E−02 | 6.5796E−03 | 0.0000E+00 | on the optical axis satisfy: ΣCT/TTL=0.44; the center thickness CT3 of the third lens L3 on the optical axis, the center thickness CT6 of the sixth lens L6 on the optical axis, and the distance TTL from the object-side surface S1 of the first lens L1 to the image plane S17 of the optical imaging system on the optical axis satisfy: (CT3+CT6)/TTL=0.11; the effective radius DT11 of the object-side surface S1 of the first lens L1 and the effective radius DT72 of the image-side surface S14 of the seventh lens L7 satisfy: DT11/DT72=1.16; and the effective radius DT11 of the object-side surface S1 of the first lens L1 and the half of the diagonal length ImgH of the effective pixel area of the electronic photosensitive element of the optical imaging system satisfy: DT11/ImgH=0.87.

Figure 2A:
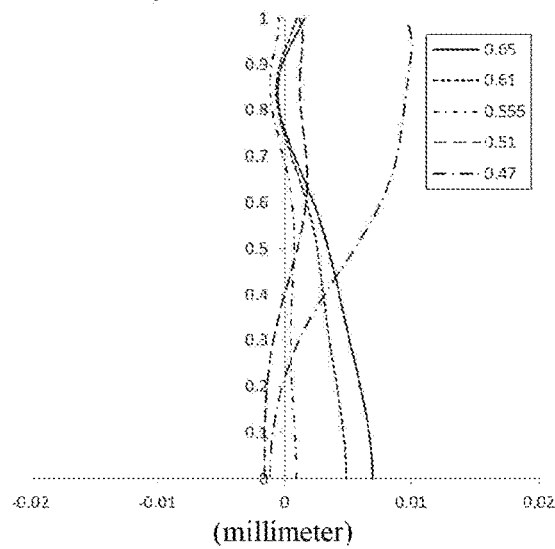
FIG. 2A illustrates a longitudinal aberration curve of the optical imaging system according to Embodiment 1.
Figure 2B:
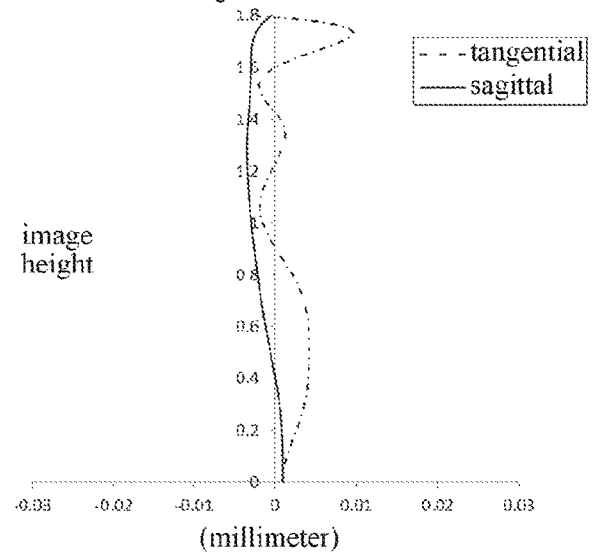
FIG. 2B illustrates an astigmatic curve of the optical imaging system according to Embodiment 1.
Figure 2C:
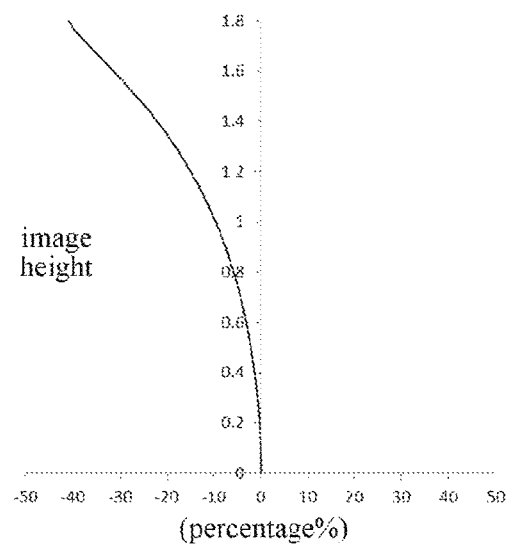
FIG. 2C illustrates a distortion curve of the optical imaging system according to Embodiment 1.
Figure 2D:
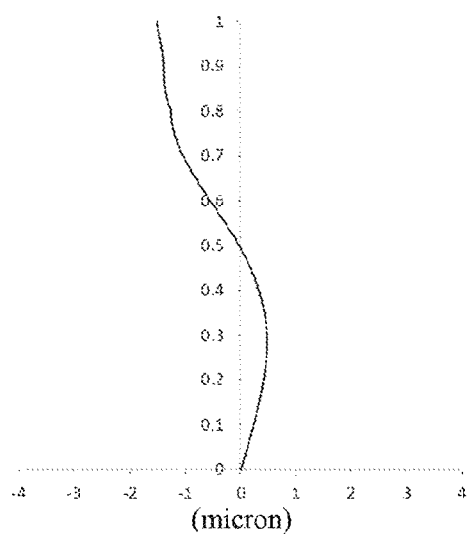
FIG. 2D illustrates a lateral color curve of the optical imaging system according to Embodiment 1.

FIG. 2A shows a longitudinal aberration curve of the optical imaging system according to Embodiment 1, representing deviations of focal points of light of different wavelengths converged after passing through an optical imaging system. FIG. 2B shows an astigmatic curve of the optical imaging system according to Embodiment 1, representing a curvature of a tangential image plane and a curvature of a sagittal image plane. FIG. 2C shows a distortion curve of the optical imaging system according to Embodiment 1, representing amounts of distortion at different viewing angles. FIG. 2D shows a lateral color curve of the optical imaging system according to Embodiment 1, representing deviations of different image heights on an image plane after light passes through the optical imaging system. It can be seen from FIG. 2A to FIG. 2D that the optical imaging system given in Embodiment 1 can achieve a good image quality.

Embodiment 2

The optical imaging system according to Embodiment 2 of the present disclosure is described below with reference to FIG. 3 to FIG. 4D. In addition to the parameters of the lenses of the optical imaging system, for example, in addition to the radius of curvature, the thickness, the conic coefficient, the effective focal length, the axial spacing distance, the higher-order coefficients of each mirror surface, and the like of the lenses, the optical imaging system described in the present Embodiment 2 and the following embodiments is the same in arrangement and structure as that of the optical imaging system described in Embodiment 1. In the present embodiment and the following embodiments, for the purpose of brevity, the description of parts similar to those in Embodiment 1 will be omitted.

Figure 3:
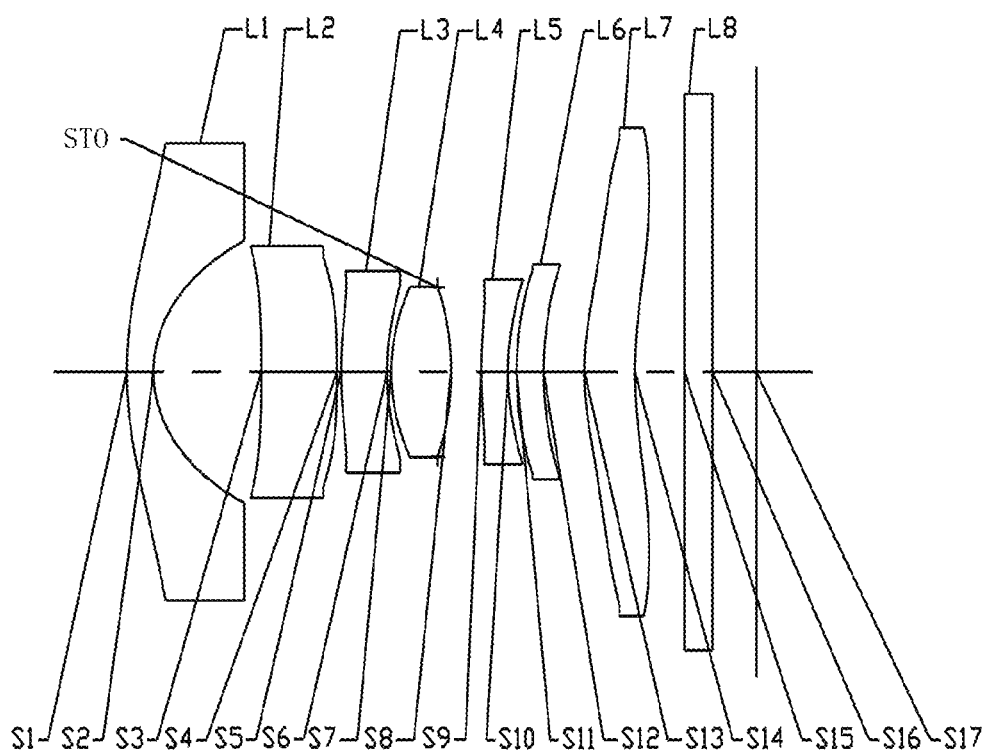
FIG. 3 is a schematic structural diagram illustrating an optical imaging system according to Embodiment 2 of the present disclosure.

FIG. 3 illustrates a schematic structural diagram of an optical imaging system according to Embodiment 2 of the present disclosure. As shown in FIG. 3, the optical imaging system according to Embodiment 2 includes the first to seventh lenses L1-L7 respectively having the object-side surface and the image-side surface. Table 4 below shows the surface type, the radius of curvature, the thickness, the material and the conic coefficient of each lens of the optical imaging system in Embodiment 2. Table 5 shows the higher-order coefficients of the aspheric mirror surfaces in Embodiment 2. Table 6 shows the effective focal lengths f1 to f7 of the lenses, the effective focal length f of the imaging lens assembly of the optical imaging system, the distance TTL from the object side surface S1 of the first lens L1 to the image plane S17 of the optical imaging system on the optical axis, the half of the diagonal length ImgH of the effective pixel area of the electronic photosensitive element of the optical imaging system and the aperture value Fno of the optical imaging system in Embodiment 2. Here, the surface types of the aspheric surfaces may be defined by the formula (1) given in the above Embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7656 | 0.2000 | 1.55 | 56.1 | −2.8441 |
| S2 | aspheric | 0.5682 | 0.8039 | | | −0.8848 |
| S3 | aspheric | −8.7139 | 0.5660 | 1.67 | 20.3 | 0.0000 |
| S4 | aspheric | −10.7565 | 0.0300 | | | 0.0000 |
| S5 | aspheric | 1.8160 | 0.3443 | 1.67 | 20.3 | −10.0000 |
| S6 | aspheric | 1.3460 | 0.0300 | | | −4.7527 |
| S7 | aspheric | 0.8823 | 0.4475 | 1.55 | 56.1 | −2.1605 |
| S8 | aspheric | −1.4367 | −0.0998 | | | −2.3814 |
| STO | spherical | infinite | 0.3244 | | | |
| S9 | aspheric | 2.1458 | 0.2000 | 1.67 | 20.3 | −9.7958 |
| S10 | aspheric | 1.1898 | 0.0647 | | | −6.0761 |
| S11 | aspheric | 1.4800 | 0.2000 | 1.55 | 56.1 | −5.7594 |
| S12 | aspheric | 1.4000 | 0.3042 | | | −10.0000 |
| S13 | aspheric | 1.2682 | 0.3771 | 1.55 | 56.1 | −7.1232 |
| S14 | aspheric | 1.9312 | 0.3714 | | | −1.3158 |
| S15 | spherical | infinite | 0.2100 | 1.52 | 64.2 | |
| S16 | spherical | infinite | 0.3263 | | | |
| S17 | spherical | infinite | | | | |

TABLE 5

| surface number | A4 | A6 | A8 | A10 | A12 |
|---|---|---|---|---|---|
| S1 | −9.6388E−02 | 2.7647E−02 | 0.0000E+00 | 0.0000E+00 | 0.0000E+00 |
| S2 | −1.2504E−01 | 2.2780E−01 | 0.0000E+00 | 0.0000E+00 | 0.0000E+00 |
| S3 | −4.9214E−02 | −2.4138E−01 | 8.2005E−02 | 1.7018E−01 | 0.0000E+00 |
| S4 | −3.7817E−01 | 5.2581E−01 | −6.4127E−01 | 4.8083E−01 | 0.0000E+00 |

TABLE 5-continued

| surface number | A4 | A6 | A8 | A10 | A12 |
|---|---|---|---|---|---|
| S5 | −4.7982E−01 | 1.1694E+00 | −2.7158E+00 | 1.3790E+00 | 0.0000E+00 |
| S6 | 1.2319E−01 | 9.8085E−03 | −2.0124E+00 | 2.1905E+00 | 0.0000E+00 |
| S7 | 5.1450E−01 | −9.4407E−01 | 8.3033E−01 | 0.0000E+00 | 0.0000E+00 |
| S8 | −2.3039E−01 | 4.3067E−01 | −2.1810E−01 | 0.0000E+00 | 0.0000E+00 |
| S9 | −6.0479E−01 | 1.2000E+00 | −2.4522E+00 | 2.3430E+00 | 0.0000E+00 |
| S10 | 3.9004E−02 | 1.4386E−01 | −3.4025E−01 | 8.1873E−01 | 0.0000E+00 |
| S11 | 1.9786E−02 | 8.0143E−01 | −2.1674E+00 | 2.8406E+00 | −1.5778E+00 |
| S12 | −8.5896E−04 | 6.4411E−01 | −2.4592E−01 | −3.1166E−01 | 0.0000E+00 |
| S13 | −3.0011E−01 | 1.6941E−01 | −6.1868E−02 | 6.3830E−03 | 0.0000E+00 |
| S14 | −2.4703E−01 | 1.3387E−01 | −5.4132E−02 | 6.5796E−03 | 0.0000E+00 |

TABLE 6

| | |
|---|---|
| f (mm) | 1.20 |
| f1 (mm) | −1.63 |
| f2 (mm) | −77.45 |
| f3 (mm) | −11.04 |
| f4 (mm) | 1.07 |
| f5 (mm) | −4.37 |
| f6 (mm) | −404.88 |
| f7 (mm) | 5.63 |
| TTL (mm) | 4.70 |
| ImgH (mm) | 1.80 |
| Fno | 2.29 |

Figure 4A:
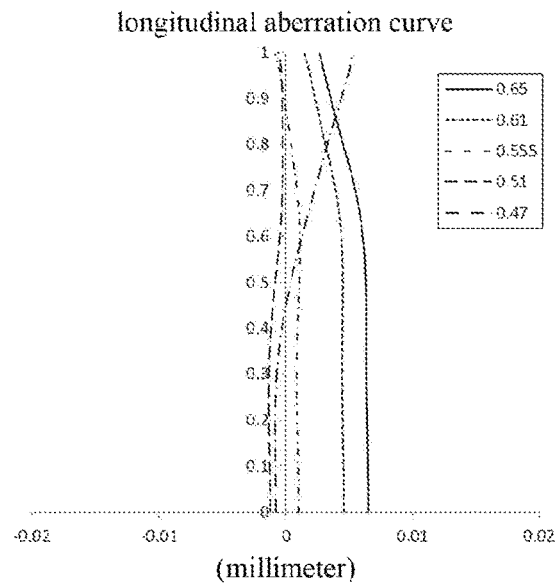
FIG. 4A illustrates a longitudinal aberration curve of the optical imaging system according to Embodiment 2.
Figure 4B:
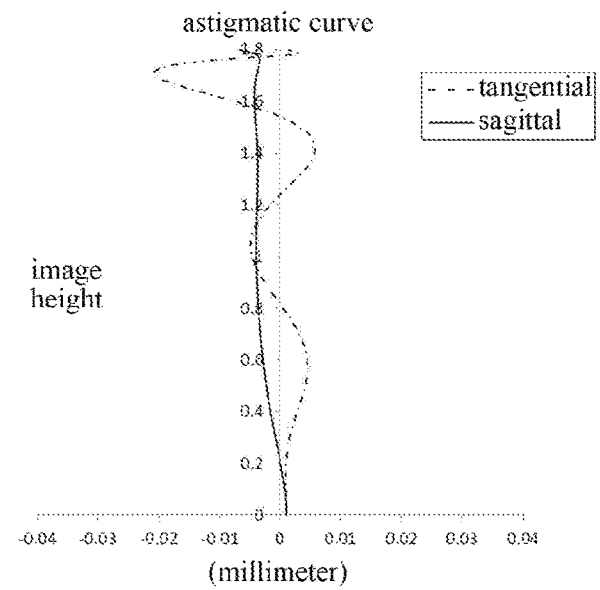
FIG. 4B illustrates an astigmatic curve of the optical imaging system according to Embodiment 2.
Figure 4C:
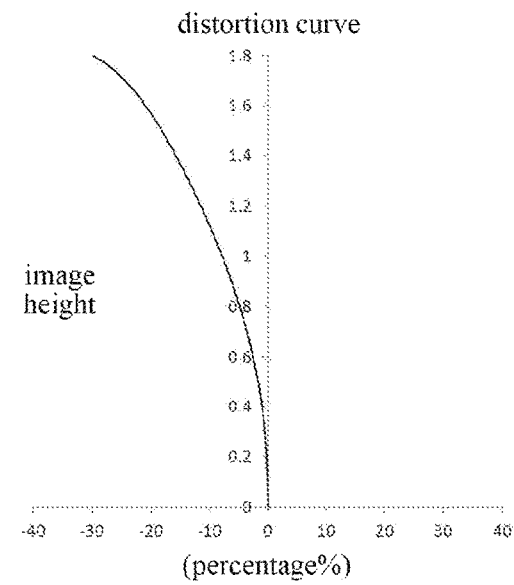
FIG. 4C illustrates a distortion curve of the optical imaging system according to Embodiment 2.
Figure 4D:
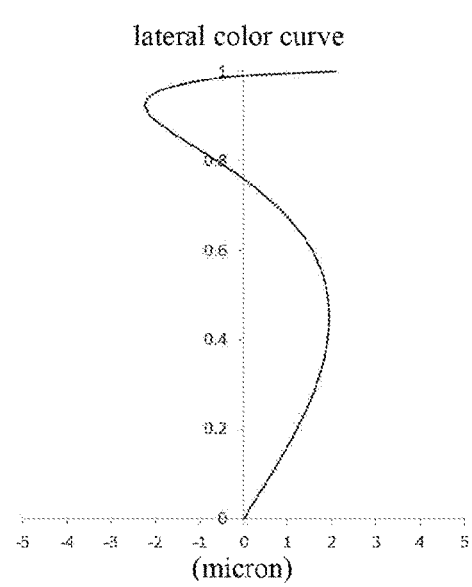
FIG. 4D illustrates a lateral color curve of the optical imaging system according to Embodiment 2.

FIG. 4A shows a longitudinal aberration curve of the optical imaging system according to Embodiment 2, representing deviations of focal points of light of different wavelengths converged after passing through an optical imaging system. FIG. 4B shows an astigmatic curve of the optical imaging system according to Embodiment 2, representing a curvature of a tangential image plane and a curvature of a sagittal image plane. FIG. 4C shows a distortion curve of the optical imaging system according to Embodiment 2, representing amounts of distortion at different viewing angles. FIG. 4D shows a lateral color curve of the optical imaging system according to Embodiment 2, representing deviations of different image heights on an image plane after light passes through the optical imaging system. It can be seen from FIG. 4A to FIG. 4D that the optical imaging system given in Embodiment 2 can achieve a good image quality.

Embodiment 3

The optical imaging system according to Embodiment 3 of the present disclosure is described below with reference to FIG. 5 to FIG. 6D.

Figure 5:
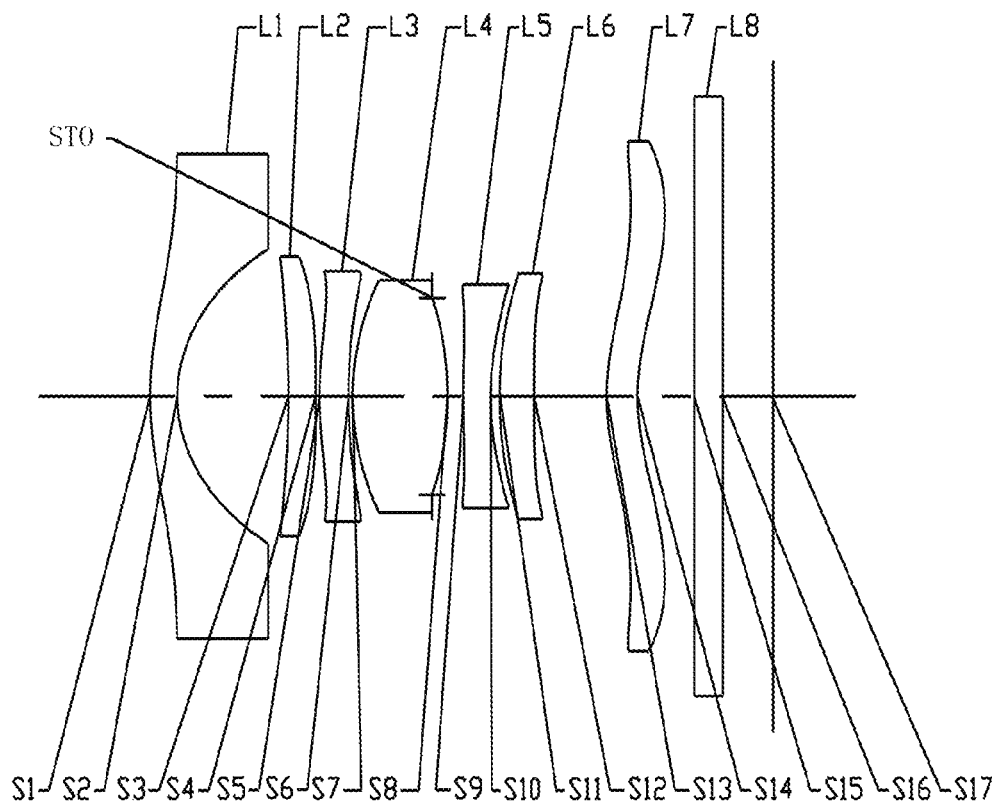
FIG. 5 is a schematic structural diagram illustrating an optical imaging system according to Embodiment 3 of the present disclosure.

FIG. 5 illustrates a schematic structural diagram of an optical imaging system according to Embodiment 3 of the present disclosure. As shown in FIG. 5, the optical imaging system according to Embodiment 3 includes the first to seventh lenses L1-L7 respectively having the object-side surface and the image-side surface. Table 7 shows the surface type, the radius of curvature, the thickness, the material and the conic coefficient of each lens of the optical imaging system in Embodiment 3. Table 8 shows the higher-order coefficients of the aspheric mirror surfaces in Embodiment 3. Table 9 shows the effective focal lengths f1 to f7 of the lenses, the effective focal length f of the imaging lens assembly of the optical imaging system, the distance TTL from the object side surface S1 of the first lens L1 to the image plane S17 of the optical imaging system on the optical axis, the half of the diagonal length ImgH of the effective pixel area of the electronic photosensitive element of the optical imaging system and the aperture value Fno of the optical imaging system in Embodiment 3. Here, the surface types of the aspheric surfaces may be defined by the formula (1) given in the above Embodiment 1.

TABLE 7

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.4296 | 0.2000 | 1.55 | 56.1 | −4.3908 |
| S2 | aspheric | 0.5680 | 0.8212 | | | −0.8427 |
| S3 | aspheric | −3.2551 | 0.2000 | 1.67 | 20.3 | −10.0000 |
| S4 | aspheric | −302.1691 | 0.0300 | | | 0.0000 |
| S5 | aspheric | 1.5932 | 0.2142 | 1.67 | 20.3 | −10.0000 |
| S6 | aspheric | 2.7460 | 0.0300 | | | −1.3014 |
| S7 | aspheric | 1.0667 | 0.7000 | 1.55 | 56.1 | −2.1637 |
| S8 | aspheric | −1.4159 | −0.1129 | | | −2.1941 |
| STO | spherical | infinite | 0.2309 | | | |
| S9 | aspheric | 4.7336 | 0.2000 | 1.67 | 20.3 | −10.0000 |
| S10 | aspheric | 1.0777 | 0.0657 | | | −9.3355 |
| S11 | aspheric | 1.5432 | 0.2571 | 1.55 | 56.1 | −6.6567 |
| S12 | aspheric | 13.3150 | 0.5353 | | | 0.0000 |
| S13 | aspheric | 0.9909 | 0.2278 | 1.55 | 56.1 | −3.4437 |
| S14 | aspheric | 0.9333 | 0.4179 | | | −3.0672 |
| S15 | spherical | infinite | 0.2100 | 1.52 | 64.2 | |
| S16 | spherical | infinite | 0.3728 | | | |
| S17 | spherical | infinite | | | | |

TABLE 8

| surface number | A4 | A6 | A8 | A10 | A12 |
|---|---|---|---|---|---|
| S1 | −1.1656E−01 | 2.6945E−02 | 0.0000E+00 | 0.0000E+00 | 0.0000E+00 |
| S2 | −1.6994E−02 | 2.0719E−01 | 0.0000E+00 | 0.0000E+00 | 0.0000E+00 |
| S3 | 1.9252E−01 | −5.6515E−01 | 1.1076E+00 | −9.4713E−01 | 0.0000E+00 |
| S4 | −7.5756E−01 | 1.3078E+00 | −1.2892E+00 | 4.1546E−01 | 0.0000E+00 |
| S5 | −3.4726E−01 | 1.8159E−01 | −4.9544E−01 | 2.6960E−01 | 0.0000E+00 |
| S6 | 3.5322E−01 | −1.1931E+00 | 1.1950E+00 | 2.5795E−01 | 0.0000E+00 |
| S7 | 1.4810E−01 | −1.0011E−01 | 1.0023E−01 | 0.0000E+00 | 0.0000E+00 |
| S8 | −2.5900E−01 | 3.6044E−01 | −3.3334E−01 | 0.0000E+00 | 0.0000E+00 |
| S9 | −5.4020E−01 | 9.0739E−01 | −5.5813E−01 | −1.6026E+00 | 0.0000E+00 |
| S10 | 1.5608E−01 | −5.5465E−01 | 1.9390E+00 | −1.9420E+00 | 0.0000E+00 |
| S11 | −6.9973E−02 | 1.5873E+00 | −5.6185E+00 | 1.0265E+01 | −8.0502E+00 |
| S12 | −9.8203E−03 | 1.3031E+00 | −2.2080E+00 | 1.1246E+00 | 0.0000E+00 |
| S13 | −3.1644E−01 | 1.9389E−01 | −6.2521E−02 | 8.4818E−03 | 0.0000E+00 |
| S14 | −2.8951E−01 | 1.7221E−01 | −7.0473E−02 | 1.0690E−02 | 0.0000E+00 |

TABLE 9

| | |
|---|---|
| f (mm) | 1.49 |
| f1 (mm) | −1.88 |
| f2 (mm) | −4.94 |
| f3 (mm) | 5.30 |
| f4 (mm) | 1.24 |
| f5 (mm) | −2.14 |
| f6 (mm) | 3.17 |
| f7 (mm) | 74.05 |
| TTL (mm) | 4.60 |
| ImgH (mm) | 1.80 |
| Fno | 2.29 |

Figure 6A:
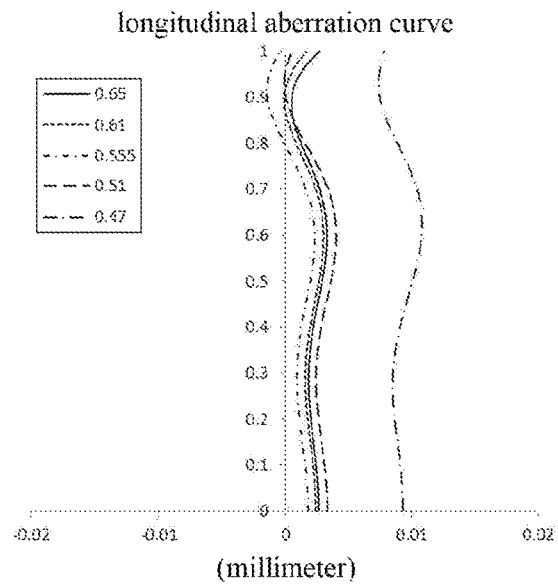
FIG. 6A illustrates a longitudinal aberration curve of the optical imaging system according to Embodiment 3.
Figure 6B:
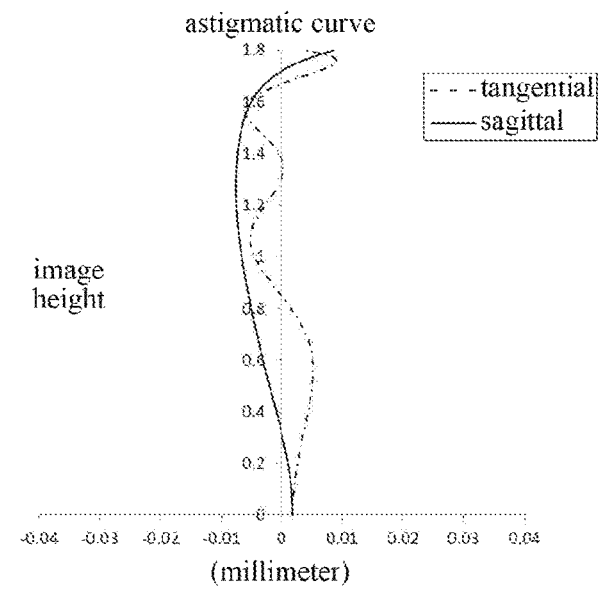
FIG. 6B illustrates an astigmatic curve of the optical imaging system according to Embodiment 3.
Figure 6C:
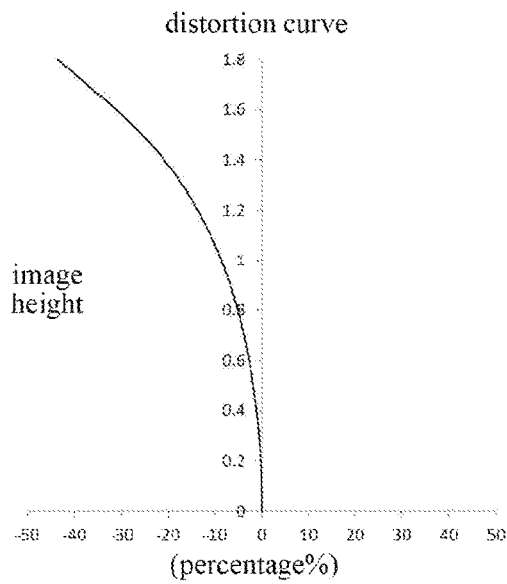
FIG. 6C illustrates a distortion curve of the optical imaging system according to Embodiment 3.
Figure 6D:
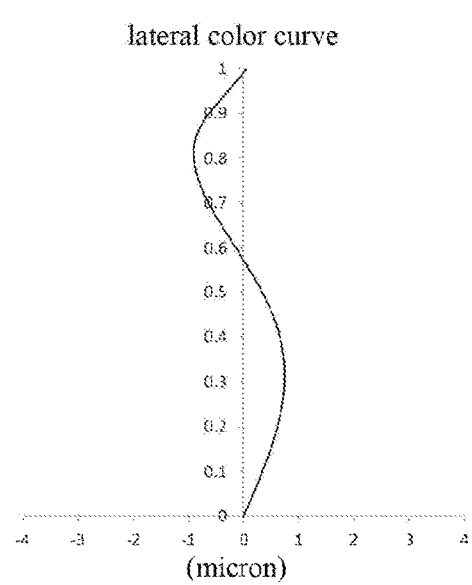
FIG. 6D illustrates a lateral color curve of the optical imaging system according to Embodiment 3.

FIG. 6A shows a longitudinal aberration curve of the optical imaging system according to Embodiment 3, representing deviations of focal points of light of different wavelengths converged after passing through an optical imaging system. FIG. 6B shows an astigmatic curve of the optical imaging system according to Embodiment 3, representing a curvature of a tangential image plane and a curvature of a sagittal image plane. FIG. 6C shows a distortion curve of the optical imaging system according to Embodiment 3, representing amounts of distortion at different viewing angles. FIG. 6D shows a lateral color curve of the optical imaging system according to Embodiment 3, representing deviations of different image heights on an image plane after light passes through the optical imaging system. It can be seen from FIG. 6A to FIG. 6D that the optical imaging system given in Embodiment 3 can achieve a good image quality.

Embodiment 4

The optical imaging system according to Embodiment 4 of the present disclosure is described below with reference to FIG. 7 to FIG. 8D.

Figure 7:
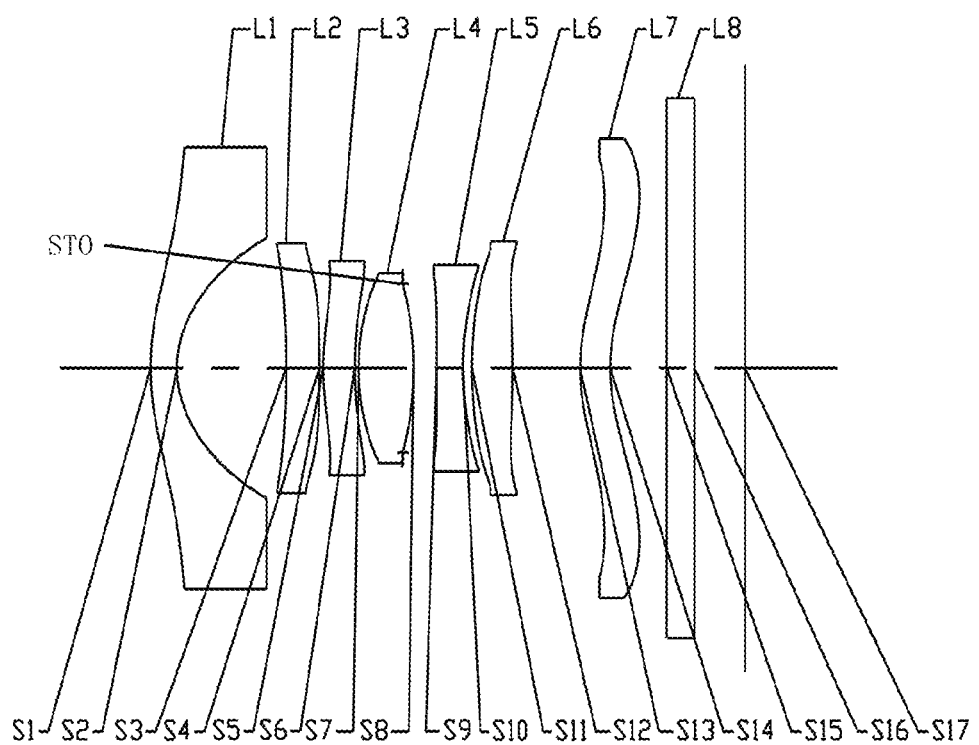
FIG. 7 is a schematic structural diagram illustrating an optical imaging system according to Embodiment 4 of the present disclosure.

FIG. 7 illustrates a schematic structural diagram of an optical imaging system according to Embodiment 4 of the present disclosure. As shown in FIG. 7, the optical imaging system according to Embodiment 4 includes the first to seventh lenses L1-L7 respectively having the object-side surface and the image-side surface. Table 10 shows the surface type, the radius of curvature, the thickness, the material and the conic coefficient of each lens of the optical imaging system in Embodiment 4. Table 11 shows the higher-order coefficients of the aspheric mirror surfaces in Embodiment 4. Table 12 shows the effective focal lengths f1 to f7 of the lenses, the effective focal length f of the imaging lens assembly of the optical imaging system, the distance TTL from the object side surface S1 of the first lens L1 to the image plane S17 of the optical imaging system on the optical axis, the half of the diagonal length ImgH of the effective pixel area of the electronic photosensitive element of the optical imaging system and the aperture value Fno of the optical imaging system in Embodiment 4. Here, the surface types of the aspheric surfaces may be defined by the formula (1) given in the above Embodiment 1.

TABLE 10

| surface number | surface type | radius of curvature | thickness | material | | conic coefficient |
| | | | | refractive index | abbe number | |
|---|---|---|---|---|---|---|
| OBJ | spherical | infinite | infinite | | | |
| S1 | aspheric | 1.1986 | 0.2000 | 1.55 | 56.1 | −3.9142 |
| S2 | aspheric | 0.5090 | 0.8262 | | | −0.8996 |
| S3 | aspheric | −4.2865 | 0.2508 | 1.67 | 20.3 | 0.0000 |
| S4 | aspheric | −279.9687 | 0.0300 | | | 0.0000 |
| S5 | aspheric | 1.3539 | 0.2386 | 1.67 | 20.3 | −10.0000 |
| S6 | aspheric | 2.0189 | 0.0300 | | | −9.2225 |
| S7 | aspheric | 1.1220 | 0.4165 | 1.55 | 56.1 | −1.8066 |
| S8 | aspheric | −1.5343 | −0.0829 | | | −4.9187 |
| STO | spherical | infinite | 0.2554 | | | |
| S9 | aspheric | 31.0164 | 0.2000 | 1.67 | 20.3 | −10.0000 |
| S10 | aspheric | 1.3733 | 0.0699 | | | −10.0000 |
| S11 | aspheric | 2.1987 | 0.3071 | 1.55 | 56.1 | −3.6312 |
| S12 | aspheric | −4.4774 | 0.5103 | | | −10.0000 |
| S13 | aspheric | 0.9574 | 0.2275 | 1.55 | 56.1 | −2.9887 |
| S14 | aspheric | 0.8934 | 0.4278 | | | −2.7260 |
| S15 | spherical | infinite | 0.2100 | 1.52 | 64.2 | |

TABLE 10-continued

| surface number | surface type | radius of curvature | thickness | material refractive index | abbe number | conic coefficient |
|---|---|---|---|---|---|---|
| S16 | spherical | infinite | 0.3827 | | | |
| S17 | spherical | infinite | | | | |

TABLE 11

| surface number | A4 | A6 | A8 | A10 | A12 |
|---|---|---|---|---|---|
| S1 | −1.2148E−01 | 3.0469E−02 | 0.0000E+00 | 0.0000E+00 | 0.0000E+00 |
| S2 | −3.9029E−02 | 3.2329E−01 | 0.0000E+00 | 0.0000E+00 | 0.0000E+00 |
| S3 | 6.8402E−02 | −3.1175E−01 | 4.1208E−01 | −2.9149E−01 | 0.0000E+00 |
| S4 | −8.4807E−01 | 1.5795E+00 | −1.8909E+00 | 1.1194E+00 | 0.0000E+00 |
| S5 | −2.0465E−01 | −7.8586E−01 | 1.2098E+00 | −1.0081E+00 | 0.0000E+00 |
| S6 | 4.8573E−01 | −2.3392E+00 | 3.6263E+00 | −2.9735E+00 | 0.0000E+00 |
| S7 | 1.5457E−01 | 2.9181E−02 | 2.2202E−01 | 0.0000E+00 | 0.0000E+00 |
| S8 | −2.5289E−01 | 4.2498E−01 | 9.0870E−02 | 0.0000E+00 | 0.0000E+00 |
| S9 | −2.7258E−01 | 2.5577E−01 | −3.0627E−01 | −2.0493E+00 | 0.0000E+00 |
| S10 | 1.3769E−01 | 4.8072E−02 | −4.7434E−01 | 7.5325E−01 | 0.0000E+00 |
| S11 | −3.6038E−02 | 1.1432E+00 | −2.9295E+00 | 3.9103E+00 | −2.5112E+00 |
| S12 | 1.9185E−02 | 9.1504E−01 | −6.1013E−01 | −2.8246E−01 | 0.0000E+00 |
| S13 | −3.3177E−01 | 1.9923E−01 | −6.2106E−02 | 3.7199E−03 | 0.0000E+00 |
| S14 | −2.9613E−01 | 1.6988E−01 | −6.2986E−02 | 6.6466E−03 | 0.0000E+00 |

TABLE 12

| | |
|---|---|
| f (mm) | 1.43 |
| f1 (mm) | −1.81 |
| f2 (mm) | −6.53 |
| f3 (mm) | 5.39 |
| f4 (mm) | 1.26 |
| f5 (mm) | −2.16 |
| f6 (mm) | 2.75 |
| f7 (mm) | 95.65 |
| TTL (mm) | 4.50 |
| ImgH (mm) | 1.80 |
| Fno | 2.39 |

Figure 8A:
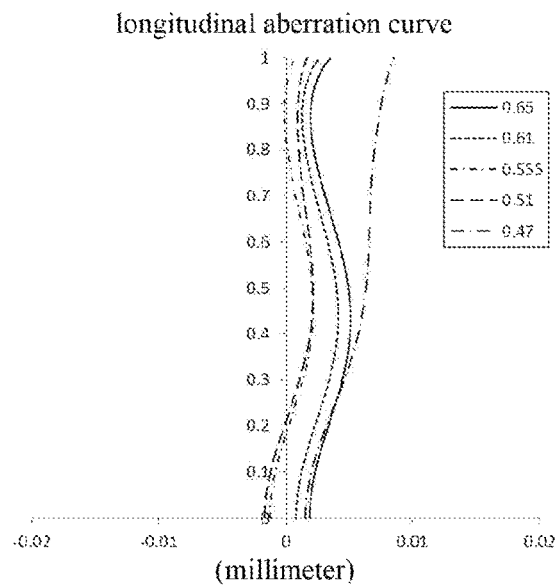
FIG. 8A illustrates a longitudinal aberration curve of the optical imaging system according to Embodiment 4.
Figure 8B:
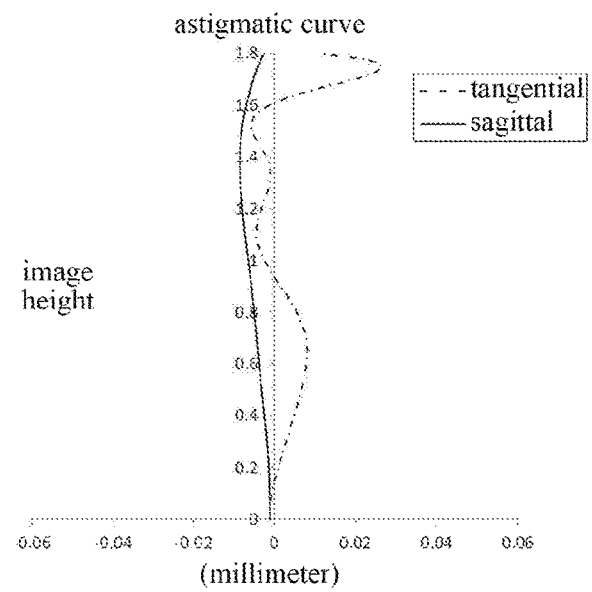
FIG. 8B illustrates an astigmatic curve of the optical imaging system according to Embodiment 4.
Figure 8C:
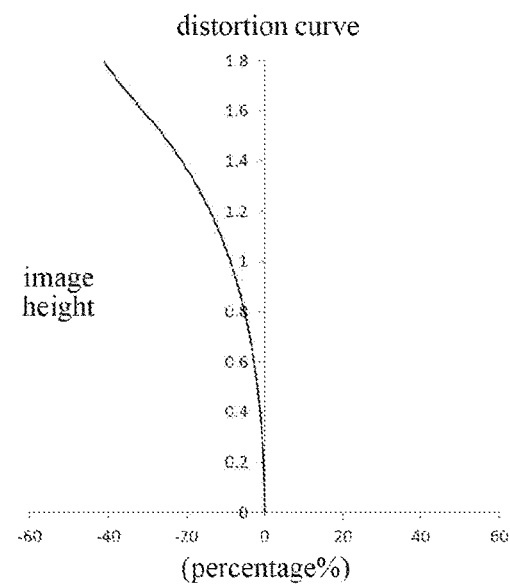
FIG. 8C illustrates a distortion curve of the optical imaging system according to Embodiment 4.
Figure 8D:
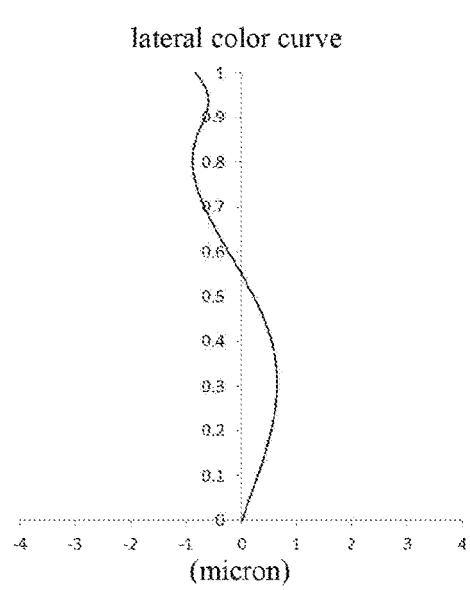
FIG. 8D illustrates a lateral color curve of the optical imaging system according to Embodiment 4.

FIG. 8A shows a longitudinal aberration curve of the optical imaging system according to Embodiment 4, representing deviations of focal points of light of different wavelengths converged after passing through an optical imaging system. FIG. 8B shows an astigmatic curve of the optical imaging system according to Embodiment 4, representing a curvature of a tangential image plane and a curvature of a sagittal image plane. FIG. 8C shows a distortion curve of the optical imaging system according to Embodiment 4, representing amounts of distortion at different viewing angles. FIG. 8D shows a lateral color curve of the optical imaging system according to Embodiment 4, representing deviations of different image heights on an image plane after light passes through the optical imaging system. It can be seen from FIG. 8A to FIG. 8D that the optical imaging system given in Embodiment 4 can achieve a good image quality.

Embodiment 5

The optical imaging system according to Embodiment 5 of the present disclosure is described below with reference to FIG. 9 to FIG. 10D.

Figure 9:
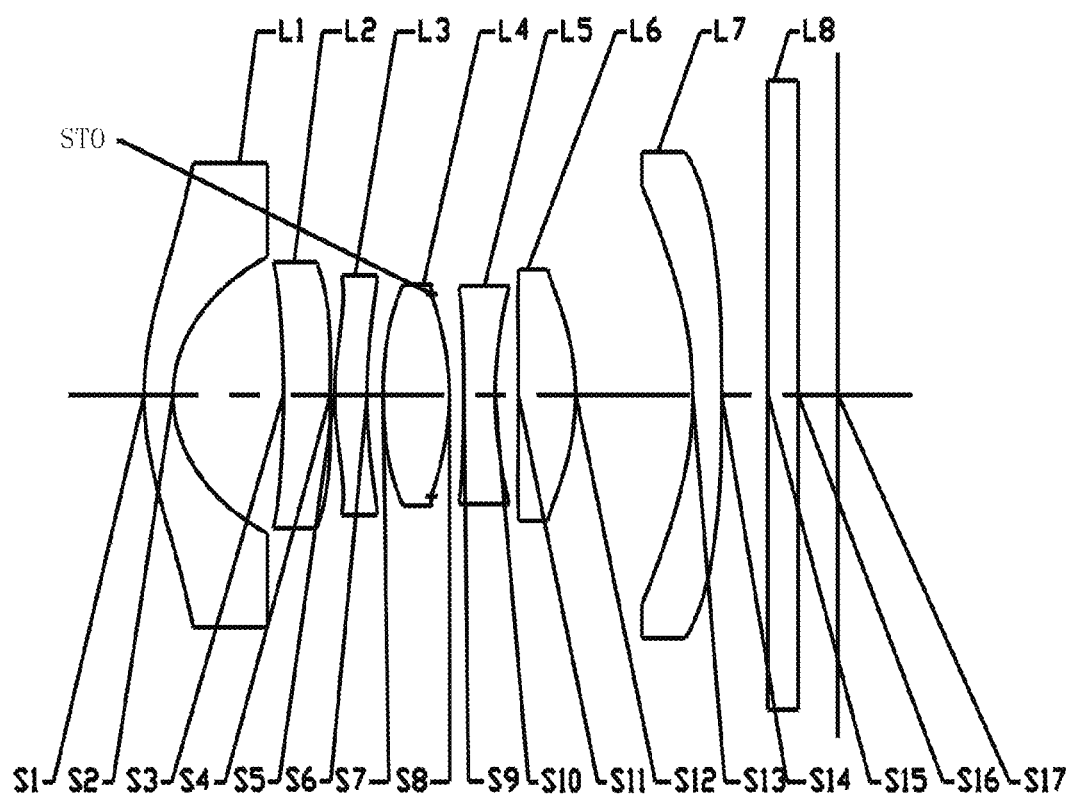
FIG. 9 is a schematic structural diagram illustrating an optical imaging system according to Embodiment 5 of the present disclosure.

FIG. 9 illustrates a schematic structural diagram of an optical imaging system according to Embodiment 5 of the present disclosure. As shown in FIG. 9, the optical imaging system according to Embodiment 5 includes the first to seventh lenses L1-L7 respectively having the object-side surface and the image-side surface. Table 13 shows the surface type, the radius of curvature, the thickness, the material and the conic coefficient of each lens of the optical imaging system in Embodiment 5. Table 14 shows the higher-order coefficients of the aspheric mirror surfaces in Embodiment 5. Table 15 shows the effective focal lengths f1 to f7 of the lenses, the effective focal length f of the imaging lens assembly of the optical imaging system, the distance TTL from the object side surface S1 of the first lens L1 to the image plane S17 of the optical imaging system on the optical axis, the half of the diagonal length ImgH of the effective pixel area of the electronic photosensitive element of the optical imaging system and the aperture value Fno of the optical imaging system in Embodiment 5. Here, the surface types of the aspheric surfaces may be defined by the formula (1) given in the above Embodiment 1.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.3285 | 0.2000 | 1.55 | 56.1 | −1.8047 |
| S2 | aspheric | 0.5712 | 0.7598 | | | −0.6403 |

TABLE 13-continued

| surface number | surface type | radius of curvature | thickness | material refractive index | abbe number | conic coefficient |
|---|---|---|---|---|---|---|
| S3 | aspheric | −4.1658 | 0.3235 | 1.67 | 20.3 | −10.0000 |
| S4 | aspheric | 19.4962 | 0.0300 | | | −10.0000 |
| S5 | aspheric | 1.2688 | 0.2231 | 1.67 | 20.3 | −9.9956 |
| S6 | aspheric | 2.6564 | 0.1098 | | | −6.6535 |
| S7 | aspheric | 1.7848 | 0.4569 | 1.55 | 56.1 | −0.2244 |
| S8 | aspheric | −1.1355 | −0.1234 | | | −4.4423 |
| STO | spherical | infinite | 0.2226 | | | |
| S9 | aspheric | −20.2320 | 0.2155 | 1.67 | 20.3 | 0.0000 |
| S10 | aspheric | 1.5291 | 0.1608 | | | −8.9574 |
| S11 | aspheric | 472.6924 | 0.3942 | 1.55 | 56.1 | −10.0000 |
| S12 | aspheric | −1.1135 | 0.8071 | | | −1.3200 |
| S13 | aspheric | −1.7418 | 0.2000 | 1.55 | 56.1 | −6.3880 |
| S14 | aspheric | −15.5032 | 0.3175 | | | 0.0000 |
| S15 | spherical | infinite | 0.2100 | 1.52 | 64.2 | |
| S16 | spherical | infinite | 0.2725 | | | |
| S17 | spherical | infinite | | | | |

TABLE 14

| surface number | A4 | A6 | A8 | A10 | A12 |
|---|---|---|---|---|---|
| S1 | −1.0549E−01 | 1.9999E−02 | 0.0000E+00 | 0.0000E+00 | 0.0000E+00 |
| S2 | −2.9924E−02 | 5.5539E−02 | 0.0000E+00 | 0.0000E+00 | 0.0000E+00 |
| S3 | 1.5504E−01 | −4.6335E−01 | 3.2921E−01 | −1.7900E−01 | 0.0000E+00 |
| S4 | −5.5093E−01 | 4.7787E−01 | −2.7791E−01 | 7.0353E−02 | 0.0000E+00 |
| S5 | −1.2236E−01 | −1.4212E+00 | 2.8452E+00 | −2.0855E+00 | 0.0000E+00 |
| S6 | 2.1880E−01 | −1.2917E+00 | 2.6563E+00 | −2.1628E+00 | 0.0000E+00 |
| S7 | 1.6318E−01 | 2.2619E−01 | −2.1248E−01 | 0.0000E+00 | 0.0000E+00 |
| S8 | −6.7354E−02 | −5.6628E−02 | 1.7576E−01 | 0.0000E+00 | 0.0000E+00 |
| S9 | −2.7354E−01 | 9.8077E−01 | −3.3141E+00 | 2.9002E+00 | 0.0000E+00 |
| S10 | −2.6411E−01 | 1.6531E+00 | −3.7171E+00 | 3.5954E+00 | 0.0000E+00 |
| S11 | −2.0075E−01 | 3.2600E−01 | 1.3545E+00 | −3.3904E+00 | 2.6298E+00 |
| S12 | −6.3692E−04 | −1.1724E−01 | 7.4522E−01 | −3.6156E−01 | 0.0000E+00 |
| S13 | −1.8158E−01 | 2.2969E−01 | −1.3521E−01 | 3.0687E−02 | 0.0000E+00 |
| S14 | −1.0130E−01 | 7.9502E−02 | −4.2843E−02 | 6.7268E−03 | 0.0000E+00 |

TABLE 15

| | |
|---|---|
| f (mm) | 1.53 |
| f1 (mm) | −2.02 |
| f2 (mm) | −5.12 |
| f3 (mm) | 3.42 |
| f4 (mm) | 1.35 |
| f5 (mm) | −2.12 |
| f6 (mm) | 2.04 |
| f7 (mm) | −3.61 |
| TTL (mm) | 4.78 |
| ImgH (mm) | 1.90 |
| Fno | 2.29 |

Figure 10A:
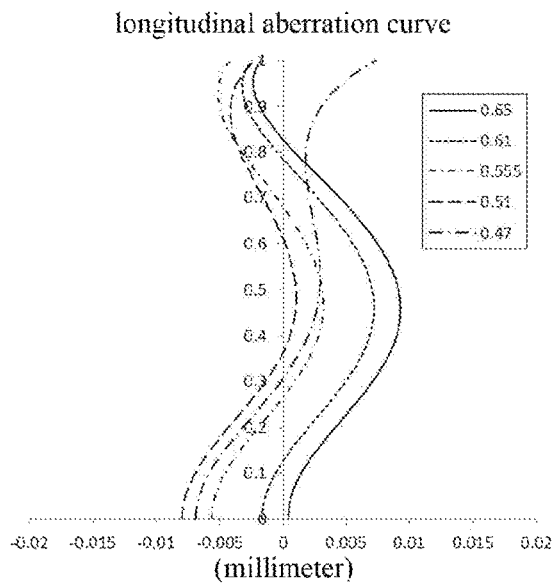
FIG. 10A illustrates a longitudinal aberration curve of the optical imaging system according to Embodiment 5.
Figure 10B:
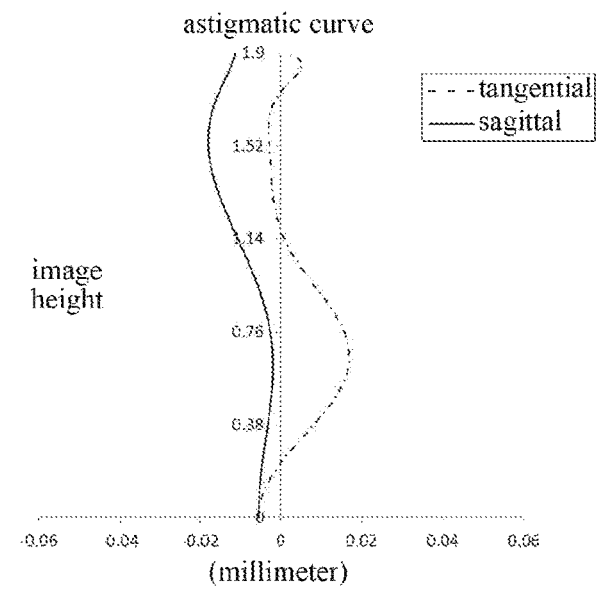
FIG. 10B illustrates an astigmatic curve of the optical imaging system according to Embodiment 5.
Figure 10C:
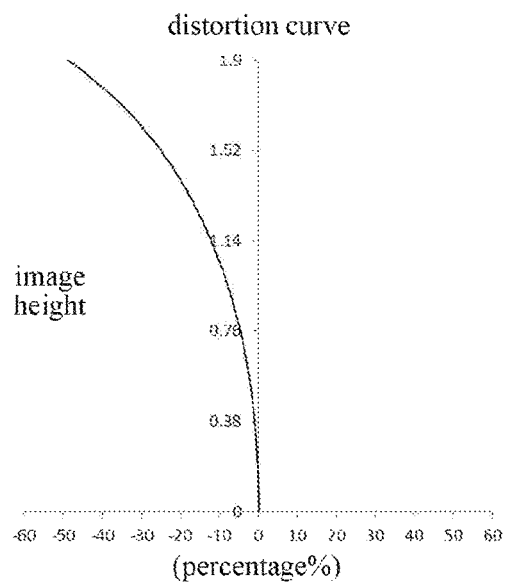
FIG. 10C illustrates a distortion curve of the optical imaging system according to Embodiment 5.
Figure 10D:
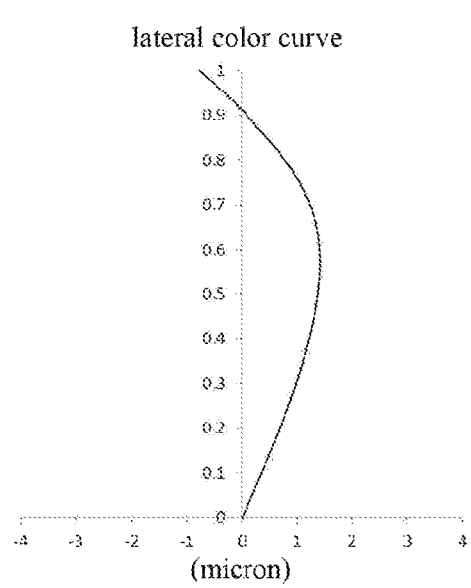
FIG. 10D illustrates a lateral color curve of the optical imaging system according to Embodiment 5.

FIG. 10A shows a longitudinal aberration curve of the optical imaging system according to Embodiment 5, representing deviations of focal points of light of different wavelengths converged after passing through an optical imaging system. FIG. 10B shows an astigmatic curve of the optical imaging system according to Embodiment 5, representing a curvature of a tangential image plane and a curvature of a sagittal image plane. FIG. 10C shows a distortion curve of the optical imaging system according to Embodiment 5, representing amounts of distortion at different viewing angles. FIG. 10D shows a lateral color curve of the optical imaging system according to Embodiment 5, representing deviations of different image heights on an image plane after light passes through the optical imaging system. It can be seen from FIG. 10A to FIG. 10D that the optical imaging system given in Embodiment 5 can achieve a good image quality.

To sum up, Embodiment 1 to Embodiment 5 respectively satisfy the relationships shown in Table 16 below.

TABLE 16

| Conditional formula | Embodiment | | | | |
|---|---|---|---|---|---|
| | 1 | 2 | 3 | 4 | 5 |
| f1/f4 | −1.44 | −1.52 | −1.52 | −1.44 | −1.50 |
| TTL/Fno | 2.10 | 2.06 | 2.01 | 1.89 | 2.09 |
| ImgH/f | 1.26 | 1.50 | 1.21 | 1.26 | 1.24 |
| CT2/CT3 | 2.42 | 1.64 | 0.93 | 1.05 | 1.45 |
| T12/T67 | 1.51 | 2.64 | 1.53 | 1.62 | 0.94 |
| ΣCT/TTL | 0.44 | 0.50 | 0.43 | 0.41 | 0.42 |
| R7/R8 | −1.26 | −0.61 | −0.75 | −0.73 | −1.57 |
| (CT3 + CT6)/TTL | 0.11 | 0.12 | 0.10 | 0.12 | 0.13 |
| DT11/DT72 | 1.16 | 1.11 | 0.87 | 0.97 | 0.99 |
| DT11/ImgH | 0.87 | 0.79 | 0.80 | 0.74 | 0.71 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features.

The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system comprising, sequentially along an optical axis from an object side to an image side, a first lens, a second lens, a third lens, a fourth lens, a fifth lens, a sixth lens and a seventh lens,
wherein the first lens has a negative refractive power, and an image-side surface of the first lens is a concave surface;
the fourth lens has a positive refractive power;
the fifth lens has a positive refractive power or a negative refractive power, and an image-side surface of the fifth lens is a concave surface;
the seventh lens has a positive refractive power or a negative refractive power;
each of the second lens, the third lens and the sixth lens has a positive refractive power or a negative refractive power; and
an effective radius DT11 of the object-side surface of the first lens and half of a diagonal length ImgH of an effective pixel area of an electronic photosensitive element of the optical imaging system satisfy: 0.5<DT11/ImgH<1.

2. The optical imaging system according to claim 1, wherein an effective focal length f1 of the first lens and an effective focal length f4 of the fourth lens satisfy: $-1.7 < f1/f4 < -1.1$.

3. The optical imaging system according to claim 1, wherein an image-side surface of the seventh lens is an aspheric surface and has at least one inflection point.

4. The optical imaging system according to claim 1, wherein a spacing distance T12 between the first lens and the second lens on the optical axis and a spacing distance T67 between the sixth lens and the seventh lens on the optical axis satisfy: 0.9<T12/T67<2.7.

5. The optical imaging system according to claim 1, satisfying:

$$(CT3+CT6)/TTL < 0.15,$$

wherein CT3 is a center thickness of the third lens on the optical axis, CT6 is a center thickness of the sixth lens on the optical axis, and TTL is a distance from the object-side surface of the first lens to an image plane of the optical imaging system on the optical axis.

6. The optical imaging system according to claim 5, wherein the distance TTL from the object-side surface of the first lens to the image plane of the optical imaging system on the optical axis and an aperture value Fno of the optical imaging system satisfy:

$$TTL/Fno < 2.2 (mm).$$

7. The optical imaging system according to claim 1, wherein the half of the diagonal length ImgH of the effective pixel area of the electronic photosensitive element of the optical imaging system and a total effective focal length f of an optical imaging lens assembly of the optical imaging system satisfy: ImgH/f>1.

8. The optical imaging system according to claim 1, wherein a center thickness CT2 of the second lens on the optical axis and a center thickness CT3 of the third lens on the optical axis satisfy: 0.9<CT2/CT3<2.5.

9. The optical imaging system according to claim 5, wherein a sum of center thicknesses ΣCT of the first lens to the seventh lens on the optical axis and the distance TTL from the object-side surface of the first lens to the image plane of the optical imaging system on the optical axis satisfy: ΣCT/TTL<0.6.

10. The optical imaging system according to claim 1, wherein a radius of curvature R7 of an object-side surface of the fourth lens and a radius of curvature R8 of an image-side surface of the fourth lens satisfy: $-1.6 < R7/R8 < -0.5$.

11. The optical imaging system according to claim 1, wherein the effective radius DT11 of the object-side surface of the first lens and an effective radius DT72 of an image-side surface of the seventh lens satisfy: 0.7<DT11/DT72<1.3.

12. An optical imaging system comprising, sequentially along an optical axis from an object side to an image side, a first lens, a second lens, a third lens, a fourth lens, a fifth lens, a sixth lens and a seventh lens,
wherein the first lens has a negative refractive power, and an image-side surface of the first lens is a concave surface;
the fourth lens has a positive refractive power;
the fifth lens has a positive refractive power or a negative refractive power, and an image-side surface of the fifth lens is a concave surface;
the seventh lens has a positive refractive power or a negative refractive power;
each of the second lens, the third lens and the sixth lens has a positive refractive power or a negative refractive power; and
a spacing distance T12 between the first lens and the second lens on the optical axis and a spacing distance T67 between the sixth lens and the seventh lens on the optical axis satisfy: 0.9<T12/T67<2.7,
wherein a distance TTL from an object-side surface of the first lens to an image plane of the optical imaging system on the optical axis and an aperture value Fno of the optical imaging system satisfy: TTL/Fno<2.2 (mm).

13. The optical imaging system according to claim 12, wherein an effective focal length f1 of the first lens and an effective focal length f4 of the fourth lens satisfy: $-1.7 < f1/f4 < -1.1$.

14. The optical imaging system according to claim 12, wherein an image-side surface of the seventh lens is an aspheric surface and has at least one inflection point.

15. The optical imaging system according to claim 12, satisfying:

$$(CT3+CT6)/TTL < 0.15,$$

wherein CT3 is a center thickness of the third lens on the optical axis, CT6 is a center thickness of the sixth lens on the optical axis, and TTL is the distance from the object-side surface of the first lens to the image plane of the optical imaging system on the optical axis.

16. The optical imaging system according to claim 15, wherein an effective radius DT11 of the object-side surface of the first lens and half of a diagonal length ImgH of an effective pixel area of an electronic photosensitive element of the optical imaging system satisfy: 0.5<DT11/ImgH<1.

17. The optical imaging system according to claim 12, wherein the half of the diagonal length ImgH of the effective pixel area of the electronic photosensitive element of the optical imaging system and a total effective focal length f of an optical imaging lens assembly of the optical imaging system satisfy: ImgH/f>1.

18. The optical imaging system according to claim 12, wherein a center thickness CT2 of the second lens on the optical axis and a center thickness CT3 of the third lens on the optical axis satisfy: 0.9<CT2/CT3<2.5.

19. The optical imaging system according to claim 15, wherein a sum of center thicknesses ΣCT of the first lens to the seventh lens on the optical axis and the distance TTL from the object-side surface of the first lens to the image plane of the optical imaging system on the optical axis satisfy: ΣCT/TTL<0.6.

20. The optical imaging system according to claim 12, wherein a radius of curvature R7 of an object-side surface of the fourth lens and a radius of curvature R8 of an image-side surface of the fourth lens satisfy: −1.6<R7/R8<−0.5.

21. The optical imaging system according to claim 12, wherein the effective radius DT11 of the object-side surface of the first lens and an effective radius DT72 of an image-side surface of the seventh lens satisfy: 0.7<DT11/DT72<1.3.

* * * * *